United States Patent
Heinzelmann

(10) Patent No.: US 8,197,380 B2
(45) Date of Patent: Jun. 12, 2012

(54) MOTOR VEHICLE AUTOMATED GEARBOX AND METHOD FOR THE OPERATION THEREOF

(75) Inventor: Karl-Fritz Heinzelmann, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1048 days.

(21) Appl. No.: 12/088,133

(22) PCT Filed: Aug. 21, 2006

(86) PCT No.: PCT/EP2006/008220
§ 371 (c)(1),
(2), (4) Date: Mar. 26, 2008

(87) PCT Pub. No.: WO2007/039021
PCT Pub. Date: Apr. 12, 2007

(65) Prior Publication Data
US 2008/0254932 A1    Oct. 16, 2008

(30) Foreign Application Priority Data
Sep. 30, 2005  (DE) .................. 10 2005 046 894

(51) Int. Cl.
*F16H 3/44* (2006.01)
*F16H 37/02* (2006.01)
*F16H 3/08* (2006.01)

(52) U.S. Cl. ............ 475/302; 475/218; 74/329; 74/330

(58) Field of Classification Search .................. 475/207, 475/218, 343, 302; 74/329, 330, 331, 333, 74/340
See application file for complete search history.

(56) References Cited

U.S. PATENT DOCUMENTS
4,544,057 A    10/1985   Webster et al.
(Continued)

FOREIGN PATENT DOCUMENTS
DE    198 59 458 A1    6/1999
(Continued)

OTHER PUBLICATIONS
Japanese Patent Office official office action for the corresponding Japanese application dated Oct. 5, 2011.

Primary Examiner — Roger Pang
(74) Attorney, Agent, or Firm — Davis & Bujold, P.L.L.C.

(57) ABSTRACT

The invention concerns an automated motor vehicle shift transmission (1) with an input shaft, an output shaft and several selectively engaged gears, the input shaft (W1) being connected to a drive motor (M) via an engine clutch (K) that can be engaged and disengaged. To avoid an interruption of the traction force during a shift process, a controllable friction clutch is provided as a change-under-load clutch (K5) to connect the input shaft (W1) directly to the output shaft (W3, W4) when necessary.

The invention also concerns a method for controlling the gearshifts of an automated motor vehicle shift transmission comprising an input shaft, an output shaft and several selectively engaged gears, and in which the input shaft is connected to a drive motor via an engine clutch that can be engaged or disengaged, such that in a shift process between a loaded gear that is engaged and a target gear to be engaged, the engine clutch remains closed during the gear change. To avoid a traction force interruption it is provided that during a shift process between two gears containing at most one direct step (i>=1), before the loaded gear is disengaged a change-under-load clutch, positioned between the input shaft (W1) and the output shaft (W3, W4), is at least partially closed in order to take over the torque transfer, the loaded gear is then disengaged, the target gear is then synchronized and engaged, and finally the change-under-load clutch (K5) is fully opened again.

12 Claims, 2 Drawing Sheets

U.S. PATENT DOCUMENTS

| | | | |
|---|---|---|---|
| 5,390,559 A * | 2/1995 | Thomas et al. | 74/325 |
| 6,591,705 B1 | 7/2003 | Reik et al. | |
| 6,709,356 B2 | 3/2004 | Fuhrer et al. | |
| 6,869,379 B2 * | 3/2005 | Voss et al. | 475/218 |
| 7,004,878 B2 * | 2/2006 | Gumpoltsberger et al. | 475/218 |
| 7,278,950 B2 * | 10/2007 | Steen et al. | 475/303 |
| 7,288,044 B2 * | 10/2007 | Gumpoltsberger | 475/218 |
| 7,470,206 B2 * | 12/2008 | Rodgers, II | 475/218 |
| 7,731,617 B2 * | 6/2010 | Gitt et al. | 475/218 |

FOREIGN PATENT DOCUMENTS

| | | |
|---|---|---|
| DE | 100 51 354 A1 | 5/2002 |
| EP | 0 800 949 A2 | 10/1997 |
| EP | 1 127 731 A2 | 8/2001 |
| EP | 1 517 066 A2 | 3/2005 |
| GB | 2 274 493 A | 7/1994 |
| JP | 58193951 A | 11/1983 |
| JP | 2003113911 A | 4/2003 |

* cited by examiner

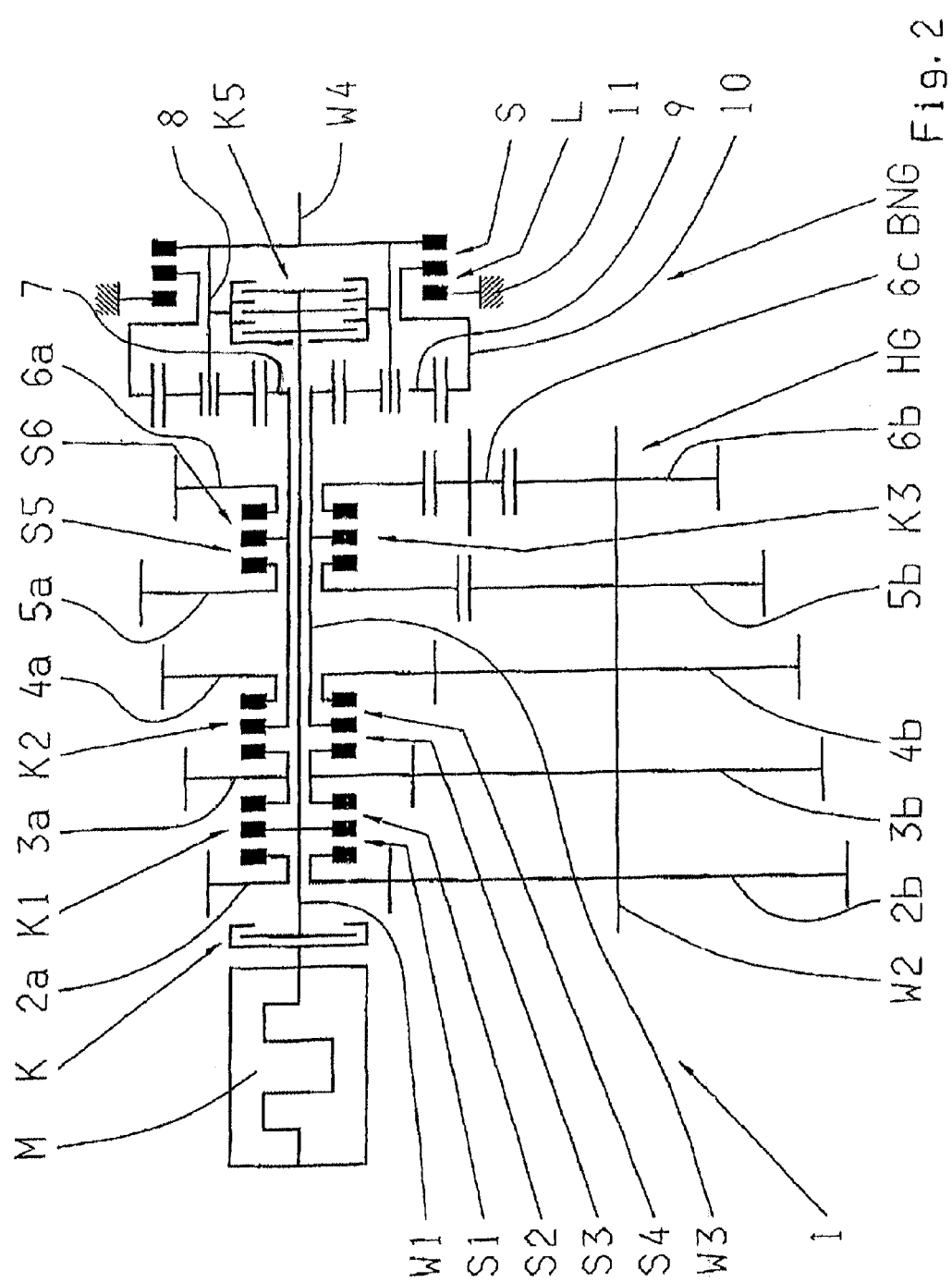

MOTOR VEHICLE AUTOMATED GEARBOX AND METHOD FOR THE OPERATION THEREOF

This application is a national stage completion of PCT/EP2006/008220 filed Aug. 21, 2006, which claims priority from German Application Serial No. 10 2005 046 894.2 filed Sep. 30, 2005.

FIELD OF THE INVENTION

The invention concerns an motor vehicle automated gearbox, with an input shaft, an output shaft and several gears that can be selectively engaged. The input shaft is connected with a drive motor via an engine clutch that can be engaged and disengaged.

The invention also concerns a method for controlling the gearshifts of a motor vehicle automated gearbox, which comprises an input shaft, an output shaft and several selectively engaged gears. The input shaft is connected to a drive motor via an engine clutch that can be engaged and disengaged, such that the engine clutch remains engaged during a shift process between a gear engaged under load and a target gear to be engaged.

BACKGROUND OF THE INVENTION

Automated shift transmissions are increasingly used in both the passenger car and commercial vehicle sectors, since while having relatively low weight, compact dimensions and high transmission efficiency, thanks to their automated shift processes, they offer greater operating comfort and reduce the fuel consumption of the motor vehicle concerned.

A disadvantage in shift transmissions, however, is the structure-entailed interruption of the force flow between the drive motor and the drive axle connected with the output shaft of the transmission during a gear change, which occurs because the engine coupling is temporarily disengaged and the shift transmission is briefly in its neutral position. During an upshift, especially an upshift in traction while driving uphill, this can result in an undesired deceleration of the motor vehicle and, during a downshift, especially a downshift while coasting downhill, to an undesired acceleration of the motor vehicle. In general this leads to a delay and to an uncomfortable course of the shift process.

For that reason, particularly in the case of commercial vehicles and to shorten the force interruption, it is known to accelerate synchronization of the respective gear to be engaged in an upshift by way of a transmission brake or, with the engine clutch engaged, by acting on the control of the engine by way of an engine brake, but this entails greater cost and complexity for the additional equipment.

Accordingly, the present invention relates both to a simple automated gearbox as used mainly in passenger cars and light transport vehicles and to range-change transmissions consisting of more than one serially coupled, part-transmission as used mainly in heavier commercial vehicles. For example, in DE 100 51 354 A1, a range-change transmission is described, which consists of a simple main gearbox made as an intermediate gear structure and a range group downstream therefrom in the form of a simple planetary gearset.

Against that background, the purpose of the present invention is to further develop an automated gearbox of the type mentioned earlier in a simple and space-saving way and in such a manner that during a shifting process the interruption of the traction force can be avoided.

In addition, a method for controlling the gearshifts of such an automated gearbox is indicated.

The solution of the objective relating to the automated gearbox consists of a controllable friction clutch, which is provided as a change-under-load clutch for connecting the input shaft directly to the output shaft, as necessary.

SUMMARY OF THE INVENTION

By at least partially engaging the change-under-load clutch, during a shift process between two gears which contain at most one direct step (ratio i=1), when the engine clutch is engaged, the torque transmitted from the drive motor via the engine clutch to the input shaft can, for the most part, be taken up. In this way, the shift clutch of the loaded, engaged gear is relieved of its load and can, therefore, be disengaged largely free from load in order to disengage the loaded gear. Likewise, the target gear to be engaged can thereby be synchronized while largely free from load and then engaged. By virtue of the transmission structure according to the invention. The shift processes can be carried out as partial changes-under-load without interrupting the force flow, provided they do not involve any overdrive step (i<1). This avoids any undesired deceleration or acceleration of the motor vehicle so that the shift process can be carried out on the whole more quickly and more comfortably.

Since the loading of the drive train is maintained, load surges and fluctuations are also avoided such that there is reduced wear on critical components of the drive train and greater overall driving comfort. Other devices provided to reduce the input speed of the shift transmission during gearshift processes, such as a transmission brake or an engine brake, can be omitted, which represents a saving.

The change-under-load clutch is preferably made as a pressure-controlled disk clutch, since such a structure has compact dimensions and, especially in relation to the transferable torque, can be controlled simply and accurately.

In the commonly used embodiment of the shift transmission as an intermediate gear structure in which the input and output shafts are co-linear, i.e., arranged axially one after the other on a common geometrical axis, the change-under-load clutch is advantageously arranged on the output side end of the output shaft. This entails relatively little structural modification of an existing series automated gearbox and can be implemented by making the output shaft a hollow shaft and extending the input shaft in a co-axial arrangement inside the output shaft as far as the output side end of the output shaft.

On the other hand, if the shift transmission is made as a range-change transmission with a range group connected downstream from a main gearbox, then the change-under-load clutch can also expediently be located inside the housing of the range group. In such a case, the structural modifications only affect the range group whereas only the input and output shafts need be modified in the main gearbox, as described earlier.

With a range group structure of the usual type, namely a simple planetary gearset with a sun gear connected to the output shaft of the main gearbox and a planetary gear carrier connected to the output shaft of the range group, which can be shifted between a geared-down, slow-drive range L and a direct fast-drive range S, the change-under-load clutch can be in drive connection between the input shaft of the main gearbox and the sun gear of the range group. In that case, shifts of the main gearbox can be carried out without interrupting the force transfer, as described earlier.

However, a range shift in which the shift takes place in the range group between the slow-drive range L and the fast-drive range S is then associated with an interruption of the traction or thrust force. To avoid this, in such a range group, the change-under-load clutch can also advantageously be arranged between the input shaft of the main gearbox and the planetary gear carrier of the range group.

The objective relating to the method for shift control is achieved during a shift process between two gears containing at most one direct step (i>=1). Before the loaded gear is disengaged, a change-under-load clutch, made as a controllable friction clutch, which is arranged between the input and output shafts, is at least partially engaged in order to take up the torque. The loaded gear is then disengaged, the target gear is then synchronized and engaged and the change-under-load clutch is finally completely disengaged again.

In such a case, owing to the usually more direct ratio compared with the effective gearbox ratio of the loaded gear, the change-under-load clutch is almost always operated in the slipping condition. The only exception to this is a shift process from the direct gear (i=1) to a lower gear (i>1), in which the change-under-load clutch can be completely engaged to take up the torque.

Once the loaded gear has been disengaged, synchronization of the target gear can be carried out or at least assisted by changing the torque transferred by the change-under-load clutch. To synchronize the target gear the change-under-load clutch is engaged a bit further during an upshift process and disengaged a bit further during a downshift process. By engaging the change-under-load clutch further, the load on the drive motor is increased and, therefore, the drive train on the input side is slowed down. By disengaging the change-under-load clutch further, the load on the automated gearbox is reduced and the drive train on the input side is accelerated by the faster-running drive motor. Thanks to such synchronization support, the customary synchronization means, such as frictional synchronization devices associated with the shift clutches, can be more compactly dimensioned since the load on them is lower or, in some cases, they can be omitted entirely.

BRIEF DESCRIPTION OF THE DRAWINGS

The invention will now be described, by way of example, with reference to the accompanying drawings in which:

FIG. 2 is a second example of a diagrammatical representation of an automated gearbox according to the invention.

DETAILED DESCRIPTION OF THE INVENTION

Figure 1:
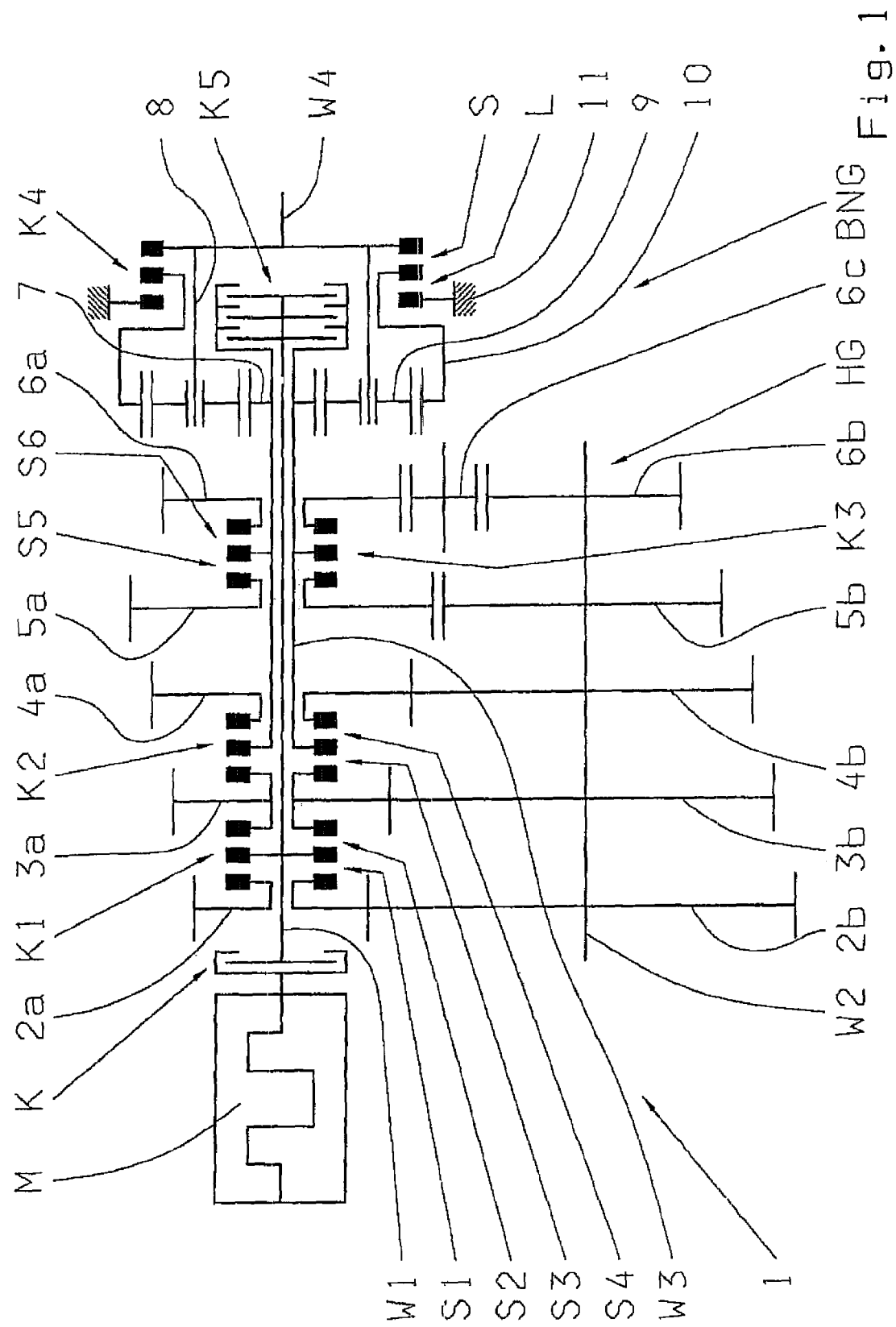
FIG. 1 is a first example of a diagrammatical representation of the automated gearbox according to the invention.

An automated gearbox 1, according to FIG. 1, is formed as a range-change gearbox with a main gearbox HG and a range group BNG connected downstream therefrom. The main gearbox HB, which has four forward gears and one reverse gear, is provided with an input shaft W1, a countershaft W2 arranged parallel thereto, and an output shaft W3 arranged co-linearly or co-axially to the input shaft W1. In this case, the output shaft W3 is made as a hollow shaft and the input shaft W1 extends centrally inside the output shaft W3 as far as the output side end of the output shaft W3 and the main gearbox HG.

On the input side, the input shaft W1 of the main gearbox is connected to a drive motor M, made as a combustion engine, by an engine clutch K that can be engaged and disengaged. Inside the gearbox, the input shaft W1 can be coupled in a shift position S1, via a first shift clutch K1, to a loose gear wheel 2a of a first gear wheel pair 2a, 2b where, owing to the fixed connection of the fixed gear wheel 2b to the countershaft W2, a driving connection can be produced between the input shaft W1 and the countershaft W2.

Alternatively the input shaft W1 can also be coupled by way of the first shift clutch K1 in a shift position S2 with a loose gear wheel 3a of a second gear wheel pair 3a, 3b.

By switching a second shift clutch K2 to a shift position S3 the loose gear wheel 3a can be coupled to the output shaft W3 so that, in this case (with the first shift clutch K1 in its shift position S2), a direct connection is made between the input shaft W1 and the output shaft W3 and the fourth forward gear, designed as a direct gear (i=1), is therefore engaged.

The next forward gear down, gear three, is engaged by switching the first shift clutch K1 to shift position S1 and switching the second shift clutch K2 to shift position S3 so that the force flow from the input shaft W1 to the output shaft W3 passes via the gear wheel pairs 2a, 2b and 3a, 3b.

In a similar manner the other gears, in the sequence second forward gear, first forward gear and the reverse gear are obtained, with the first shift clutch K1 in shift position S1, by switching the second shift clutch K2 to a shift position S4, by switching a third shift clutch K3 to a shift position S5, and by switching the third shift clutch K3 to shift position S6, respectively, and the rotation direction reversal needed for the reverse gear is brought about by an intermediate gear wheel 6c arranged between an associated loose gear wheel 6a and a fixed gear wheel 6b concerned.

The range group BNG, arranged on the output side of the main gearbox HG downstream therefrom, is made as a simple planetary gearset with a sun gear 7, with a plurality of planetary gears 9 which are mounted to rotate on a planetary gear carrier 8 and which mesh with the sun gear 7 and with a ring gear 10 which meshes with the planetary gears 9.

The sun gear 7 serves as the input element of the range group BNG and is mounted in a rotationally fixed manner on the output shaft W3 of the main gearbox HG. The planetary gear carrier 8 serves as the output element of the range group BNG and is connected in a fixed manner to an output shaft W4 of the range group BNG. The ring gear 10 is connected to the clutch cage of a fourth shift clutch K4, which can be selectively coupled with a housing 11 to engage a slow-gear stage L and with the planetary carrier 8 to engage a direct, fast-gear stage S. In the slow-gear stage L, the planetary gears 9 rotate, with the corresponding speed step-down of the planetary carrier 8, between the rotating sun gear 7 and the locked ring gear 10. In the fast-drive stage S, owing to the coupling of the sun gear 7 to the planetary carrier 8, all the components of the planetary transmission rotate strictly at the speed of the sun gear 7.

According to the invention, in this gearbox 1, a change-under-load clutch K5 is provided between the input shaft W1 and the output shaft W3 of the main gearbox HG, which is preferably made as a disk clutch and, in the version according to FIG. 1, is arranged to save space inside the range group BNG between the input shaft W1 of the main gearbox HG that is extended for the purpose and the sun gear 7.

Because of this, shift processes can be carried out within the main gearbox HG as partial shifts under load with the engine clutch K engaged, i.e., without interrupting the traction or thrust force since, in a shift process between an engaged loaded gear and a target gear to be engaged, the change-under-load clutch K5 is first engaged in slipping operation until the torque transferred by the engine clutch K is mostly transmitted directly by the change-under-load clutch K5 from the input shaft W1 to the output shaft W3. The loaded gear can then be disengaged largely free from load and the target gear then synchronized and engaged. In doing this, synchronization can at least be assisted by a corresponding adjustment of the change-under-load clutch K5, i.e., by engaging it a bit further in the case of an upshift or disengaging it a bit further in the case of a downshift.

Once the target gear has been engaged, the change-under-load clutch K5 is again disengaged fully. However, notwithstanding all its advantages, the arrangement shown in FIG. 1 has the disadvantage that a range shift within the range group BNG, i.e., a switch between the slow-gear stage L and the fast-gear stage S, is still associated with an interruption of the force flow.

To avoid this disadvantage, in the second embodiment of the automated gearbox 1, according to FIG. 2, in which the structure and arrangement of the main gearbox HG and the range group BNG are in other respects the same, the change-under-load clutch K5 is now arranged within the range group BNG, in driving connection between the input shaft W1 of the main gearbox HG and the planetary carrier 8 and, therefore, the output shaft W4 of the range group BNG connected to the planetary carrier 8. This enables shift processes that involve a range change also to be completely carried out as partial changes-under-load, by virtue of the change-under-load clutch K5.

| Reference numerals | | | |
|---|---|---|---|
| 1 | automated gearbox | K | engine clutch |
| 2a | loose gear wheel | K1 | (first) shift clutch |
| 2b | fixed gear wheel | K2 | (second) shift clutch |
| 3a | loose gear wheel | K3 | (third) shift clutch |
| 3b | fixed gear wheel | K4 | (fourth) shift clutch |
| 4a | loose gear wheel | K5 | change-under-load clutch |
| 4b | fixed gear wheel | L | shift position (of K4), |
| 5a | loose gear wheel | | slow-gear stage (of BNG) |
| 5b | fixed gear wheel | M | drive motor |
| 6a | loose gear wheel | S | shift position (of K4), |
| 6b | fixed gear wheel | | fast-gear stage (of BNG) |
| 6c | intermediate gear wheel | S1 | shift position (of K1) |
| 7 | sun gear | S2 | shift position (of K1) |
| 8 | planetary gear carrier | S3 | shift position (of K2) |
| 9 | planetary gear | S4 | shift position (of K2) |
| 10 | ring gear | S5 | shift position (of K3) |
| 11 | housing | S6 | shift position (of K3) |
| | | W1 | input shaft (of HG) |
| BNG | range group | W2 | countershaft (of HG) |
| HG | main gearbox | W3 | output shaft (of HG) |
| i | gear ratio | W4 | output shaft (of BNG) |

The invention claimed is:

1. An automated motor vehicle gearbox comprising:
a transmission input shaft (W1), a main gearbox output shaft (W3, W4), a transmission output shaft (W4) and a plurality of engagable gears;
an engine clutch (K) for engaging and disengaging an input end of the transmission input shaft (W1) with a drive motor (M) for supplying drive to the automated motor vehicle gearbox;
the main gearbox output shaft (W3) being hollow and having an input end for receiving drive from the plurality of engagable gears and having an opposed output end connected with a change-under-load friction clutch (K5);
the transmission input shaft (W1) being co-axial with the main gearbox output shaft (W3) and passing through the main gearbox output shaft (W3), and an output end of the transmission input shaft (W1) being connected to the change-under-load friction clutch (K5);
the transmission input shaft (W1) being coaxial with the transmission output shaft (W4) so that the transmission input shaft (W1) and the transmission output shaft (W4) being rotatable relative to one another; and
the change-under-load friction clutch (K5) controllably coupling the transmission input shaft (W1) directly with the transmission output shaft (W4) as desired.

2. The automated gearbox according to claim 1, further comprising a range group (BNG) and a main gearbox (HG), and the range group (BNG) is located downstream of the main gearbox (HG) and is coupled thereto, and the change-under-load clutch (K5) is located inside a housing (11) of the range group (BNG).

3. The automated gearbox according to claim 2, wherein
the range group (BNG) comprises a planetary gearset which comprises a sun gear (7) and a planetary gear carrier (8),
the sun gear (7) is connected to the main gearbox output shaft (W3) and the planetary gear carrier (8) is connected to the transmission output shaft (W4), and
the change-under-load friction clutch (K5) is arranged, in a power flow direction, between the transmission input shaft (W1) and the sun gear (7) of the range group (BNG) and the sun gear (7) is supported, by the main gearbox output shaft (W3), at a locating between the input end and the output end of the main gearbox output shaft (W3).

4. The automated gearbox according to claim 2, wherein
the range group (BNG) comprises a planetary gearset which comprises a sun gear (7) and a planetary gear carrier (8),
the sun gear (7) is connected to the main gearbox output shaft (W3) and the planetary gear carrier (8) is connected to the transmission output shaft (W4), and
the change-under-load friction clutch (K5) is arranged, in a power flow direction, between the transmission input shaft (W1) and the planetary carrier (8) of the range group (BNG).

5. The automated gearbox according to claim 1, wherein the change-under-load friction clutch (K5) is a pressure-controlled disk clutch.

6. The automated gearbox according to claim 1, wherein the automated gearbox comprises both a range group (BNG) and a main gearbox (HG), and at least one gear of the range group (BNG) is located between the main gearbox (HG) and the change-under-load clutch (K5).

7. The automated gearbox according to claim 1, wherein the automated gearbox comprises both a range group (BNG) and a main gearbox (HG), the range group (BNG) includes a planetary gear set, and the planetary gear set is located between the main gearbox (HG) and the change-under-load clutch (K5).

8. The automated gearbox according to claim 1, wherein the automated gearbox comprises both a range group (BNG) and a main gearbox (HG), the range group (BNG) includes a planetary gear set, the planetary gear set is located between the main gearbox (HG) and the change-under-load clutch (K5), and the transmission input shaft (W1) and the transmission output shaft (W4) are separate from one another.

9. A method for controlling gear shifts of an automated motor vehicle gearbox which has a main gearbox (HG) having an input shaft (W1), a hollow main gearbox output shaft (W3) and a plurality of gear wheels, the input shaft (W1) being co-axial with the hollow main gearbox output shaft (W3) and extending through a first end of the hollow main gearbox output shaft (W3) to an output end of the hollow main gearbox output shaft (W3); an engine clutch (K) being arranged between a drive motor (M) and the input shaft (W1) for selectively engaging and disengaging the input shaft (W1)

with the drive motor (M); a range group (BNG) being located downstream of the main gearbox (HG) and the range group (BNG) having an output shaft (W4), a planetary gearset and a change-under-load friction clutch (K5); the change-under-load friction clutch (K5) being directly connected, on a first side, to the end of the main gearbox hollow output shaft (W3) of the main gearbox (HG), remote from the drive motor (M), and, on a second side, to the input shaft (W1) of the main gearbox (HG); the hollow main gearbox output shaft (W3) being further connected to at least one of a sun gear (7) of the planetary gearset, a planetary carrier of the planetary gearset and the output shaft (W4) of the range group (BNG); and the planetary gearset of the range group (BNG) being located between the change-under-load friction clutch (K5) and the main gearbox (HG), the method comprising the steps of:

- maintaining engagement of the drive motor (M) with the transmission input shaft (W1), via engagement of the engine clutch (K), when shifting from an engaged loaded gear to a target gear, with the shift from the engaged loaded gear to the target gear containing at most one direct step (I>=1);
- at least partially engaging the transmission input shaft (W1) and the main gearbox output shaft (W3, W4) via a controllable change-under-load friction clutch (K5), which is located therebetween, for controllably adjusting torque transfer;
- disengaging the loaded gear;
- synchronizing the target gear by manipulating the torque that is transferrable by the change-under-load friction clutch (K5);
- engaging the target gear; and
- completely disengaging the change-under-load friction clutch (K5).

10. The method according to claim 9, further comprising the step of, if the gear shift is an up-shift, further engaging the change-under-load friction clutch (K5) when synchronizing the target gear.

11. The method according to claim 9, wherein further comprising the step of, if the gear shift is a downshift, further disengaging the change-under-load friction clutch (K5) when synchronizing the target gear.

12. An automated motor vehicle gearbox (1) comprising:

- a main gearbox (HG) having an input shaft (W1), a hollow main gearbox output shaft (W3) and a plurality of gearwheels, the input shaft (W1) being co-axial with the hollow main gearbox output shaft (W3) and extending through a first end of the hollow main gearbox output shaft (W3) to an output end of the hollow main gearbox output shaft (W3);
- an engine clutch (K) being arranged between a drive motor (M) and the input shaft (W1) for selectively engaging and disengaging the input shaft (W1) with the drive motor (M);
- a range group (BNG) being located downstream of the main gearbox (HG) and the range group (BNG) having an output shaft (W4), a planetary gearset and a change-under-load friction clutch (K5);
- the change-under-load friction clutch (K5) being directly connected, on a first side, to an end of the main gearbox hollow output shaft (W3) of the main gearbox (HG), remote from the drive motor (M), and, on a second side, to the input shaft (W1) of the main gearbox (HG);
- the hollow main gearbox output shaft (W3) is further connected to at least one of a sun gear (7) of the planetary gearset, a planetary carrier of the planetary gearset and the output shaft (W4) of the range group (BNG); and
- the planetary gearset of the range group (BNG) being located between the change-under-load friction clutch (K5) and the main gearbox (HG).

* * * * *